United States Patent [19]
Gorniak

[11] Patent Number: 4,961,138
[45] Date of Patent: Oct. 2, 1990

[54] SYSTEM AND APPARATUS FOR PROVIDING THREE DIMENSIONS OF INPUT INTO A HOST PROCESSOR

[75] Inventor: Andrew M. Gorniak, Oxford, Conn.

[73] Assignee: General DataComm, Inc., Middlebury, Conn.

[21] Appl. No.: 418,694

[22] Filed: Oct. 2, 1989

Related U.S. Application Data

[63] Continuation of Ser. No. 44,969, May 1, 1987.

[51] Int. Cl.⁵ .............................................. G06F 3/03
[52] U.S. Cl. ............................... 364/200; 364/236.8; 364/237.8; 364/518; 364/521; 340/710
[58] Field of Search ... 364/200 MS File, 900 MS File, 364/518, 521; 340/706, 709, 710

[56] References Cited

U.S. PATENT DOCUMENTS

| | | | |
|---|---|---|---|
| 3,761,877 | 9/1973 | Fernald | 340/146.35 Y |
| 3,806,912 | 4/1974 | Eckert | 340/347 R |
| 3,956,588 | 5/1976 | Whetstone et al. | 178/19 |
| 4,009,338 | 2/1977 | Dym et al. | 178/18 |
| 4,206,314 | 6/1980 | Prugh et al. | 178/19 |
| 4,243,843 | 1/1981 | Rocheleau | 178/19 |
| 4,318,096 | 3/1982 | Thornburg et al. | 364/518 |
| 4,364,035 | 12/1982 | Kirsch | 340/710 |
| 4,409,479 | 10/1983 | Sprague et al. | 250/237 G |
| 4,514,726 | 4/1985 | Whetstone et al. | 340/710 |
| 4,524,421 | 6/1985 | Searby et al. | 364/521 |
| 4,543,571 | 9/1985 | Bilbrey et al. | 340/710 |
| 4,550,316 | 10/1985 | Whetstone et al. | 340/710 |
| 4,628,755 | 12/1986 | Hawley | 74/471 XY |
| 4,633,416 | 12/1986 | Walker | 364/521 |
| 4,644,101 | 2/1987 | Jin et al. | 178/18 |
| 4,680,577 | 7/1987 | Straayer et al. | 340/711 |
| 4,705,942 | 11/1987 | Budrikis et al. | 250/227 |
| 4,787,051 | 11/1988 | Olson | 364/518 |
| 4,812,829 | 3/1989 | Ebina et al. | 340/709 |
| 4,823,634 | 4/1989 | Culver | 74/471 XY |
| 4,835,528 | 5/1989 | Flinchbaugh | 340/709 |
| 4,839,838 | 6/1989 | LaBiche et al. | 364/709.11 |
| 4,853,630 | 8/1989 | Houston | 324/208 |

OTHER PUBLICATIONS

"Compact Large-Area Graphic Digitizer for Personal Computers" by de Brnyne, Peiter; *IEEE CG&A*, Dec. 1986, pp. 49-53.

"Data Entry Devices Get Smart" by Rodgers, James; *CAE*, Mar. 1987, pp. 52-58.

*Machine Design*, Jan. 8, 1987, p. 58.

*Primary Examiner*—Gareth D. Shaw
*Assistant Examiner*—Maria Napiorkowski
*Attorney, Agent, or Firm*—David P. Gordon

[57] ABSTRACT

A system under the hand held control of a user for providing three dimensions of input to a computer processor while operating on an essentially planar surface is disclosed. The system of the invention generally comprises: an apparatus operated over a substantially planar surface; a means chosen from one of a means for detecting and measuring movement of the apparatus in two perpendicular dimensions along the substantially planar surface and a means for determining the location of the apparatus in two perpendicular dimensions along the substantially planar surface, and for providing first outputs representative of either the two-dimensional location or the movement of the apparatus; means for detecting and measuring an analog third dimension input into the apparatus under the control of the user while the apparatus is located along the planar surface, and for providing a second output representative of the third dimension input; and means for receiving the first outputs and the second output and providing therefrom information suitable for input into the computer processor, wherein the information is representative of the three dimensions of input. The apparatus of the system can take various forms such as a computer mouse, a stylus for a bit pad, or a light pen.

16 Claims, 6 Drawing Sheets

SYSTEM AND APPARATUS FOR PROVIDING THREE DIMENSIONS OF INPUT INTO A HOST PROCESSOR

This is a continuation of co-pending application Ser. No. 044,969 filed on May 1, 1987.

BACKGROUND

This invention relates to systems and apparatus for providing three dimensions of input to a host processor. More particularly, this invention relates to input devices for computer processor, such as a computer mouse, a stylus for a bit pad, a light pen, etc., which are capable of providing three dimensions of input while operating on an essentially planar surface. At the outset it should be understood that the input of a user into the devices of the invention is a three dimensional input under the hand control of the user and is analog in form. The devices measure the analog information either digitally or in an analog manner. Regardless, the information is processed by the apparatus of the invention or by associated microprocessors such that a host processor such as a computer can decipher the information. With the present technology, the processed information for input into the computer processor must be in digital form before it may be used by the computer processor.

With the advent of the personal computer, the number of different hand-held input devices for computer processors has increased greatly. Most such hand-held input devices provide input of information based on the x and y coordinates of the device. Perhaps the most common of such devices include the light pen, a stylus for a bit pad, and the computer mouse. The light pen operates on the face of a CRT using light output received from the electron beam to determine position. The light pen may be used to move a cursor on a screen to the x and y positions pointed to by the user and thus input information.

The stylus and bit pad combination have taken many different forms in the art. The electrostatic or capacitive stylus and bit pad arrangements provide an electric field between the pen stylus or cursor and a special pad surface containing an antenna, grid or the like. The pen or cursor emits a sine wave signal which is picked up by x and y direction lines in the antenna or grid. The amplitude or phase shift of the wave picked up by the antenna provides an indication of the pen location.

An electromagnetic bit pad arrangement provides for the electromagnetic coupling between the stylus and the bit pad or tablet. The stylus typically contains a small coil which acts as the primary while the tablet has a grid of copper wires which acts as a secondary of an air-core transformer. The exact location of the stylus is determined by scanning the wires of the tablet and analyzing the signals. Other stylus-bit pad arrangements include sonic digitizers where the stylus emits a sound wave and the pad or tablet includes strip microphones which monitor the tablet. The microphones precisely pinpoint the location of the stylus. In all of the arrangements of the art, the stylus and bit pad permit users to operate interactively with a screen so as to create images or make selections. Also, the stylus and bit pad permit a user to digitize information by entering precise positions from an existing drawing.

Also known to the art is a three dimensional stylus manufactured by Polhemus Navigation Sciences of Colchester, Vt. The Polhemus Navigation Sciences stylus can be moved over the surface of a nonmetallic object to provide a three dimensional digitization of the object by measuring the z distance from the stylus to the bit pad, as well as the x and y locations of the stylus according to the electromagnetic arrangement described above.

The mechanical computer mouse (an example of which is seen in block diagram form in FIG. 1), which is probably the most common of the hand-held input devices for desktop computers, typically takes the form of a roller ball having electronically sensed x and y movement. Optical, sonic, and resistive sensing are all known. With the optical and sonic mouse arrangements, the mouse may be independent of direct wiring to the computer but must be in view of the computer. In the resistive mouse arrangement, depending on the length of the connective wire, the mouse need not be in view of the computer.

As seen in FIG. 1, some mechanical mouse arrangements not only provide for x and y direction sensing via x direction sensor 12 and y direction sensor 14, but also provide function buttons such as buttons 16 and 18. The x and y directional movements are analog inputs. However, the sensors 12 and 14 typically provide a binary or digital output which may be forwarded to a microprocessor 20. The microprocessor then interprets the binary values to represent the x and y movement of the mouse. The function button inputs which represent an on or off state are also forwarded to microprocessor 20, and from the start are in the form of digital information. Thus, a binary 1 is interpreted as a switch open, and a binary 0 indicates a switch closure (or vice versa). The digital information from the x and y sensors and the push buttons is then converted into parallel or serial data format and sent to the computer interface 25 (via an EIA Driver 26 if the data is in serial form). The data is typically asynchronous data which contains the directional movement of the mouse along with the switch selection data. The computer may then interpret the data via a software program and perform the functions of the switches and determine the x and y movements of the mouse. If desired, the computer software can be used to obtain configuration information from the microprocessor and to change the configuration information (via EIA Receiver 28 if in serial form) so as to change, e.g. the motion sensitivity of the mouse or the data format.

It will be appreciated that various computer software programs have been developed which utilize a computer mouse such as seen in FIG. 1 as an input which permits the user to have a three dimensional graphics function by entering information such as dimensions regarding the external surfaces of an object. This may be accomplished by moving the mouse over desired distances and clicking the function button of the mouse, or in other ways known in the art. With that information and in conjunction with highly technical and detailed software, a computer processor is capable of providing three-dimensional renderings of an object and even of rotating an object around a desired axis.

Computer renderings needing functions such as line thicknesses, dithering, shadings and color are presently being accomplished in a manner similar to the three dimensional graphics situation. Thus, in drawing lines, the line drawing function requires the user to pre-define or preset the line width of the line to be drawn. This selection is typically made from an option menu which may either appear on the perimeter of the screen at all times or may be invoked through the use of a mouse. The menu is typically invoked by either pressing a button located on the mouse, or by moving the cursor to the specified location on the screen which causes the menu to appear, and then pushing the button. Regardless, the user must make a digital selection of line width by stepping through a sequence of steps, and this sequence must be repeated each time the line width is to be changed. Even then, the line thickness is constant once selected and can only be increased in discrete steps. It will be apprected that the same is true for shading, color, and dithering selections.

SUMMARY OF THE INVENTION

It is therefore an object of the invention to provide a system having input devices for a host processor which are capable of simultaneously providing three dimensions of input including an analog third dimension while the device is operating on an essentially planar surface.

It is a further object of the invention to provide an input device for a host processor, the input device being a computer mouse, a stylus, or a light pen which are capable of providing three analog dimensions of input from a user.

It is yet a further object of the invention to provide input devices for host processors where the devices when used by the user simultaneously provide three dimensions with one dimension resulting from the pressure sensitivity of the input device.

It is even a further object of the invention to provide input devices for host processors where the devices simultaneously provide three dimensions with a third analog dimension resulting from a pressure insensitive means of the input device.

Other objects of the invention include the provision of input devices for host processors which provide digital information in three dimensions from measuring analog user input in three dimensions, with one analog dimension resulting from the pressure sensitivity of the input device, and the pressure sensitivity resulting from a hydraulic, piezoeletric, magnetic, sonic, optical, or resistive arrangement.

According to the preferred embodiment of the invention, a system for providing three dimensions of input to a host processor, wherein three dimensions of analog input into the system is under the hand control of a user, comprises:

(a) an apparatus under the hand control of a user and operated along a substantially planar surface;

(b) means chosen from one of
a means for detecting and measuring movement of the apparatus in two perpendicular dimensions along the substantially planar surface and
a means for determining the location of the apparatus in two perpendicular dimensions along the substantially planar surface,
and for providing first outputs representative of one of the two-dimensional location and the movement of the apparatus;

(c) means for detecting and measuring an analog third dimension input into the apparatus under the control of the user while the apparatus is located along the planar surface, and for providing a second output representative of the third dimension input; and (d) means for receiving the first outputs and the second output and providing therefrom information suitable for input into the host processor, wherein the information is representative of the three dimensions of input.

According to one set of preferred embodiments, the third dimension of input is measured in an analog manner and the measurement means is a pressure sensitive device. Such pressure sensitive devices may be arbitrarily divided into those devices which use or measure wave signals, and those devices which use or measure electrical effects. Examples of the first group would include means for the measurement of sonic, optical, or magnetic distance between the means under pressure and the planar surface. Examples of the second group would include, e.g.: strain gauges where wires are strained or bent by pressure to provide new values for the wire resistance and hence a different voltage over the wire; piezoelectric devices where pressure causes a bending of a crystalline structure, thereby creating current flow; hydraulic sensors using strain gauges or piezoelectric devices; force sensitive resistors; and Hall effect magnetic conductor devices.

According to another set of embodiments, the means for measuring a third analog input is a pressure insensitive device. Examples of such devices might include a movable lever, a thumb wheel, or a slider.

The three dimension input device of the invention may take many forms. For example, a computer mouse could be arranged with either a pressure sensitive or pressure insensitive means to measure an analog third dimension. Likewise, a light pen or a stylus and bit pad may be arranged with either pressure sensitive or insensitive means. Further, the means for receiving the processed three dimensioned outputs of e.g. the mouse also may take numerous forms. For example, a microprocessor might be externally wired to the mouse, included in the mouse, or the mouse might be arranged with ultrasonic or infrared pulsors which are arranged to signal provided detectors. (See, e.g. de Bruyne, Pieter, "Compact Large-Area Graphic Digitizer for Personal Computers" *IEEE CG&A*, December 1986 ppg. 49–53.

The input device of the invention may be used for many purposes. The third dimension under the control of the user could be translated by the processor into a z dimension for providing a three dimensional computer graphics capability. Thus, by applying pressure to the mouse or stylus, one could move objects "into" the picture. Or, if desired, the third dimension could be rotational. Further, an analog intensity function, or analog line width function capable of being changed dynamically for computer "paint" or desktop publishing programs may be provide. As such, the three dimensions of analog input would allow dynamic changes in a "third dimension" and replace the need for the user to repetitively follow a procedure of hitting a push button switch, moving to a different part of a program to choose intensity, and then returning to the drawing each time an intensity or line width had to be changed.

A better understanding of the invention and additional advantages and objects of the invention will become apparent to those skilled in the art upon reference to the detailed description and the accompanying drawings.

DETAILED DESCRIPTION OF THE PREFERRED EMBODIMENT

Figure 1:
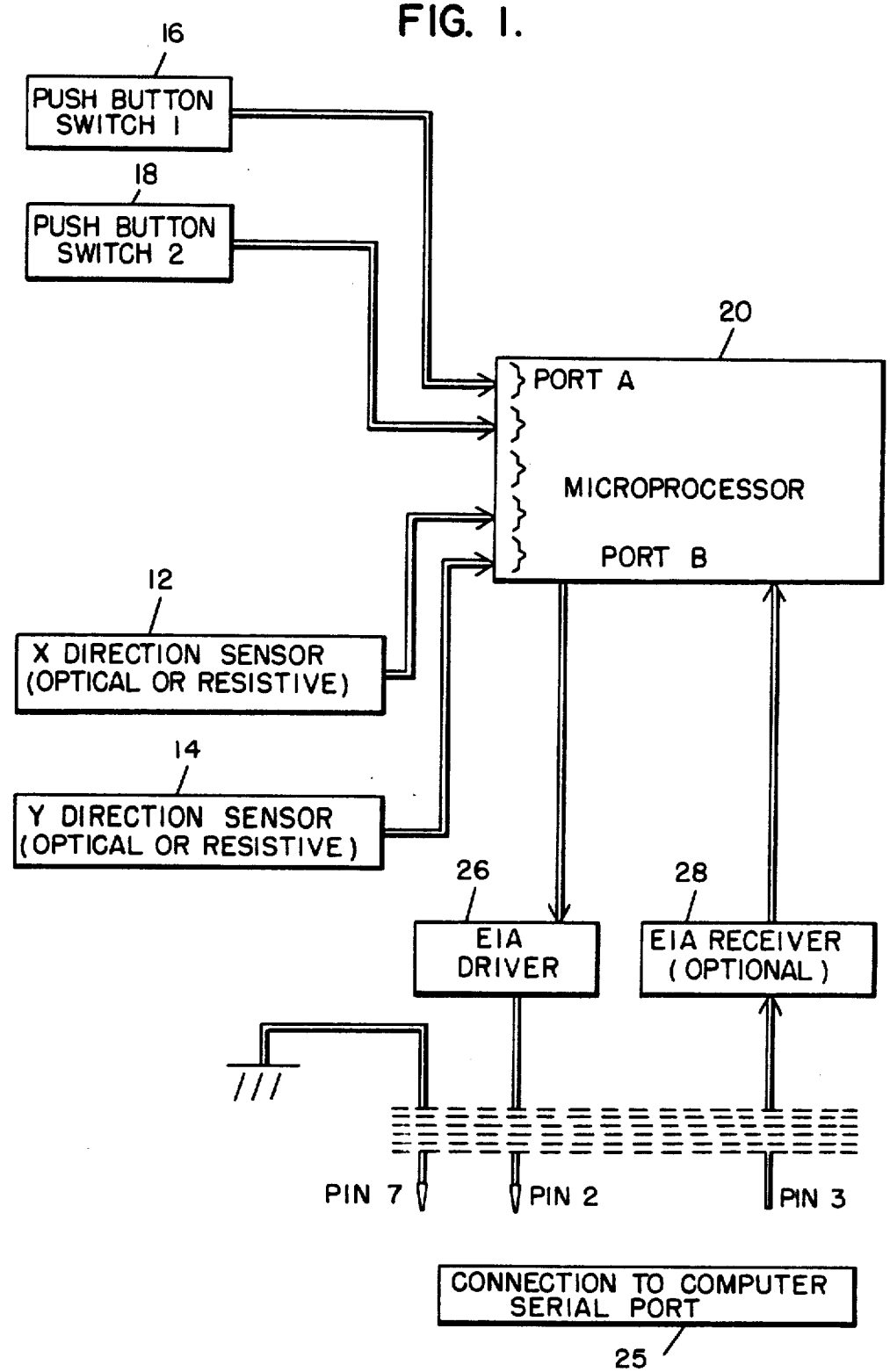
FIG. 1 is a block diagram of a typical prior art two dimensional input device for a host computer.
Figure 2A:
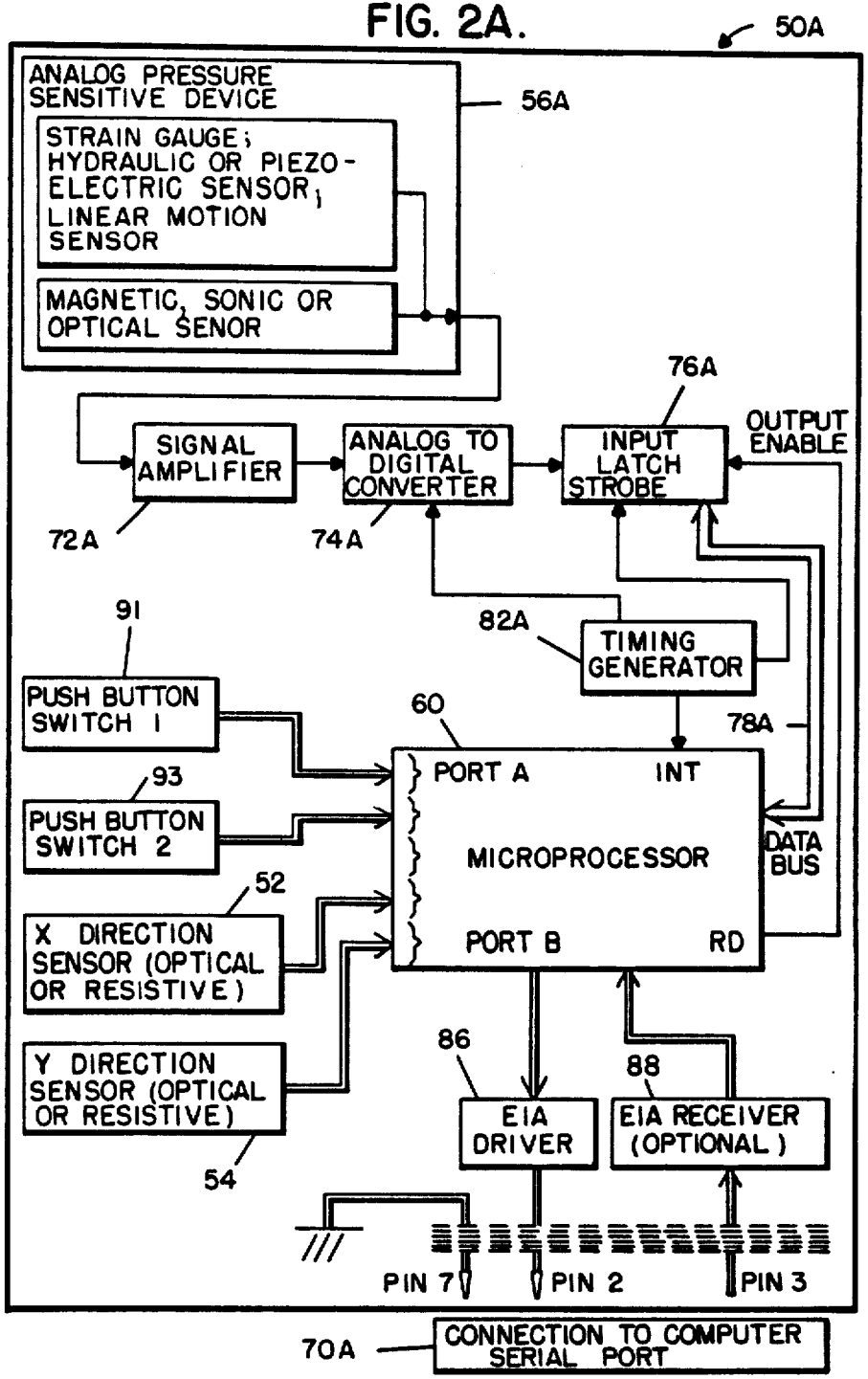
FIG. 2A is a block diagram of a three dimension input apparatus of the invention where an analog third dimension is determined through the use of a pressure sensitive device.

Before turning to FIG. 2A, it is useful to define certain terminology. The invention is referred to as an "input" "system" and "apparatus" for a host processor. The term "input" is chosen to indicate that the output of the system or apparatus of the invention is information which is sent as input to a host processor. The term "system" is used to indicate that the manner of sensing three dimensions of user input may be contained in separate devices, or in a single "apparatus". The invention is also said to have three "dimensions" with an analog third dimension. This language is chosen to indicate that the user has under hand control three dimensions of input (e.g. x, y, and z), and that the third input (e.g. z) is analog or variable in nature as opposed to a digital (on-off) input of a switch.

Turning to FIG. 2A, one set of preferred embodiments of the three dimension input apparatus of the invention is seen in block diagram form. The input apparatus 50a is essentially comprises of means 52 and 54 for detecting the location of or for detecting and measuring a movement of the apparatus or device 50a in two perpendicular dimensions along a substantially planar surface, and for providing outputs representative of the two-dimensional (i.e. x and y) location or movement of the device 50a, a means 56a for measuring and detecting a third dimension analog input into the device 50a and providing an output representative of a third dimension input while the device is located along the planar surface, and a means 60a for receiving the outputs from means 52, 54 and 56a and providing therefrom information suitable for input into a computer processor 70. More particularly, device 50a contains an x direction sensor 52 and a y direction sensor 54, both of which may take various forms (e.g. a computer mouse, a stylus and bit pad, or a light pen) as is well known in the art. (Reference may be had for example, to U.S. Pat. Nos. 3,761,877 to Fernald, 3,806,912 to Eckert, 3,956,588 to Whetstone et al., 4,009,338 to Dym et al., 4,206,314 to Prugh et al., 4,243,843 to Rocheleau, 4,364,035 to Kirsch, and 4,628,755 to Hawley, and to articles such as: Rodgers, James, "Data Entry Devices Get Smart" *CAE*, March 1987 pp. 52-58; de Bruyne, Pieter, "Compact Large-Area Graphic Digitizer for Personal Computers" *IEEE CG&A*, December 1986 pp. 49-53). It will be appreciated that with the mechanical computer mouse, the x and y direction sensors take the form of detecting and measuring movement and providing an output which relates to the movement, whereas with the stylus and bit pad, the x, y location of the stylus is sensed by sensing means 52 and 54 and an output representing the location is provided. In all cases, the sensors 52 and 54 may sense in a digital or analog manner according to their particular arrangement. If the sensors provide analog outputs, the analog outputs may be digitized by circuitry connected with the sensors themselves or by circuitry within the microprocessor 60a.

According to the invention, additional information regarding a third dimension is also received by the microprocessor 60a. In the embodiment of FIG. 2A, an analog pressure sensitive device 56a provides an output representative of the analog third dimension in one of many ways as will be discussed hereinafter. The provided analog voltage signal is then typically amplified by amplifier 72a which may take the form of operational amplifiers or discrete transistors with appropriate gain to bring the voltage to within the optimum operating range of the analog-digital converter 74a. The digitized information is then passed to a latch 76a where it is held until it is fed to the microprocessor 60a via the data bus 78a. The flow of information from the A/D converter 74a to the latch 76a to the microprocessor 60a is controlled by timing generator 82a which may derive its timing from the clock of microprocessor 60a. Thus, timing generator 82a provides a sampling rate clock to the A/D converter 74a and a strobe to the latch 76a such that it will receive the next digital sample. Once the digital information is latched in latch 76a, the timing generator pulses the interrupt line of microprocessor 60a to inform it of the availability of the information. Microprocessor 60a, which may be an eight bit processor such as the INTEL 8749, or a sixteen or thirty-two bit processor as desired, along with the necessary peripheral hardware, must then read the digital information by pulsing the output enable signal of the latch 76a. Pulsing the latch causes the binary data to appear on the data bus 78a.

In response to information received from sensors 52, 54, and 56a, the microprocessor takes the information and preferably outputs an asynchronous digital data stream. The asynchronous data stream contains directional movement data along with pressure sensitivity data. Also, if binary switches such as push button switches 91 and 93 are provided on the input device 50a and connected to the microprocessor 60a, the asynchronous data stream may also include switch data. Regardless, if the data stream is in a serial format, it is sent to the EIA driver 86 which converts the digital data stream voltage level from TTL levels to EIA levels so that it may be read by the host processor 700 of the associated computer. If desired, an EIA receiver 88 may be supplied such that the microprocessor 60a may be controlled by the host processor 700 of the computer. In this manner, the computer user could command the microprocessor 60a to change the pressure sensitivity information or data of sensor 56a, or the movement or location sensitivity information or data of sensors 52 and 54. It will be noted that if the data is in a parallel format, the data may be sent directly to the interface circuitry of the host processor 70, and that the host processor could likewise control the microprocessor 60a.

Figure 2B:
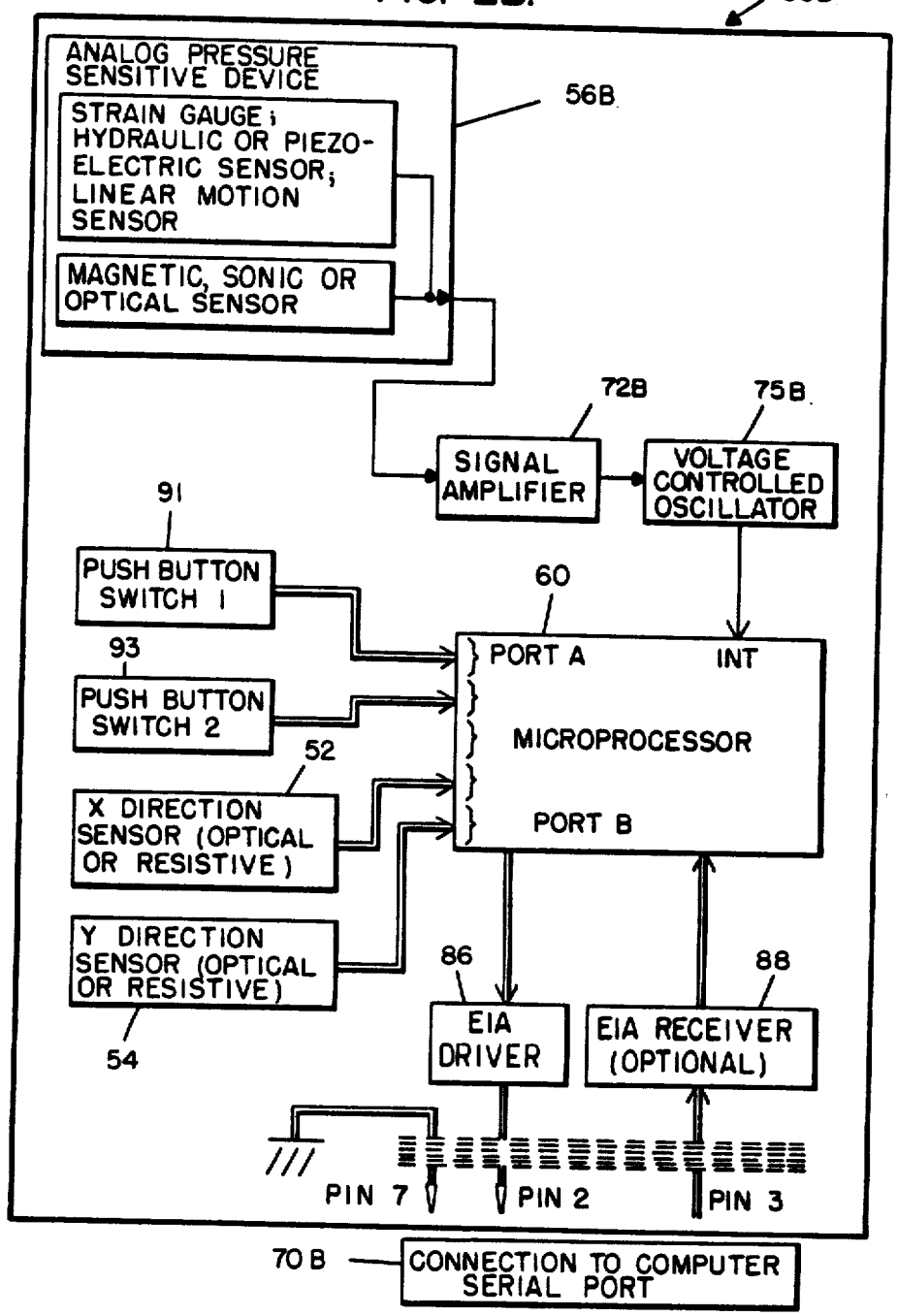
FIG. 2B is a block diagram of a three dimension input apparatus of the invention and shows an alternative to the means of FIG. 2A for inputting the analog third dimension information into a microprocessor.

Turning to FIG. 2B, an alternative embodiment for taking analog third dimension information from the pressure sensitive sensor 56b and providing microprocessor 60b with corresponding data is seen. The analog pressure sensor 56b is arranged to create a voltage level output corresponding to the pressure change on the sensor 56b. The voltage signal is then amplified by amplifier 72b so that it is brought within the optimum control voltage operating range of the voltage controlled oscillator 75b. The frequency of the oscillator is controlled by the input voltage, and the output frequency is fed into the microprocessor 60b. Microprocessor 60b determines the frequency of the oscillator 75b, with the frequency variation being proportionate to the pressure being exerted on the sensor 56b. The frequency is then measured and converted by software into a digital form and is included in the asynchronous data stream as described with regard to FIG. 2A.

Returning to the analog pressure sensitive device 56a which provides information to the microprocessor 60a of an analog third dimension, it will be appreciated that the device 56a can take any of a plethora of forms. While there is no intent to be limited thereto, the devices for providing pressure sensitivity appear to easily group into two particular groups: devices which measure or use wave signals; and devices which use or measure electrical properties.

Among the electrical pressure sensitive devices known in the art are pressure transducers of the resistive, inductive, and capacitive types. An example of a resistive pressure transducer is a strain gauge where a wire is arranged so that when pressure is exerted on the wire or on a thin metal strip to which the wire is attached, the resistance of the wire changes accordingly. With a constant voltage being applied over the wire, the current can than be used as a gauge of the pressure being exerted. Similarly, inductive and capacitive pressure transducers can be arranged where the pressure causes a ferrous rod or the like to move into a coil of wire (in the inductive case), or parallel plates to move closer together (in the capacitive case) to provide electrical signals indicative of the force exerted. Another electrical pressure sensitive device known in the art is the piezoeletric transducer which uses a crystalline structure to produce a voltage when compressional (and expansional) or torsional stress is applied. With the piezoelectric transducer, a voltage is only produced when the device undergoes a change in stress. Thus, an integration circuit would be preferable for purposes of the invention where the force (rather than change in force) is to be measured. Yet another type of electrical pressure sensitive device is a pressure sensitive resistor (see, e.g. *Machine Design*, Jan. 8, 1987 p.58). The pressure sensitive resistor decreases in resistance when a force is applied to it.

Another arrangement using an electrical pressure transducer could include a hydraulic sensor comprised of a container for fluid having a pipe or the like with a strain gauge or piezoelectric transducer at the end of the pipe. When external pressure is placed on the container, the fluid pressure will increase and the increased pressure will be measured by the strain gauge or transducer.

Another group of electrical pressure sensitive devices may be grouped under the term "linear motion" devices. These devices include resistance devices such as potentiometers, and Hall effect magnetic resistance devices. In the potentiometer linear motion device, a spring loaded sliding potentiometer could be used. As the spring is depressed, the resistance of the potentiometer would change. Likewise, with Hall effect devices, a magnet could be attached to a movable mechanism such as a spring loaded lever. A Hall effect switch, such as a semiconductor which possesses a special property which enables it to conduct electricity when subjected to a magnetic field, could be placed in close proximity to the movable lever mechanism. Thus, as force was applied to the lever and spring, the magnet would move closer to the Hall effect switch, which would then start conducting an electrical current. The conductivity of the switch (i.e. the current passing therethrough) could then be used as a gauge of the force applied, or the linear (z) movement of the device.

Turning to the pressure sensitive wave devices, it will be appreciated that in some manners the pressure sensitive wave devices are similar to the linear motion devices. If desired, a sonic source and detector could be located on the undersurface of a spring-loaded device to which pressure is applied. When the spring-loaded device deflected towards the bottom surface, the time it takes for a sonic wave to travel from the source to a fixed bottom surface and back to the detector decreases as the distance decreases. The third, pressure sensitive dimension may then be calculated from the sonic wave time. Similar techniques could be used with optic waves and magnetic waves using time (phase shift) and/or intensity as a gauge of deflection.

Other manners for using wave sensing are also available. For example, sonic or optic sources and their respective detectors could be located across from each other with a deflecting mechanism located above and therebetween. As the deflecting mechanism deflects due to the application of force, it could block the sonic or optic waves reaching the detectors. The received wave intensity could then be a gauge of the applied force.

Figure 2C:
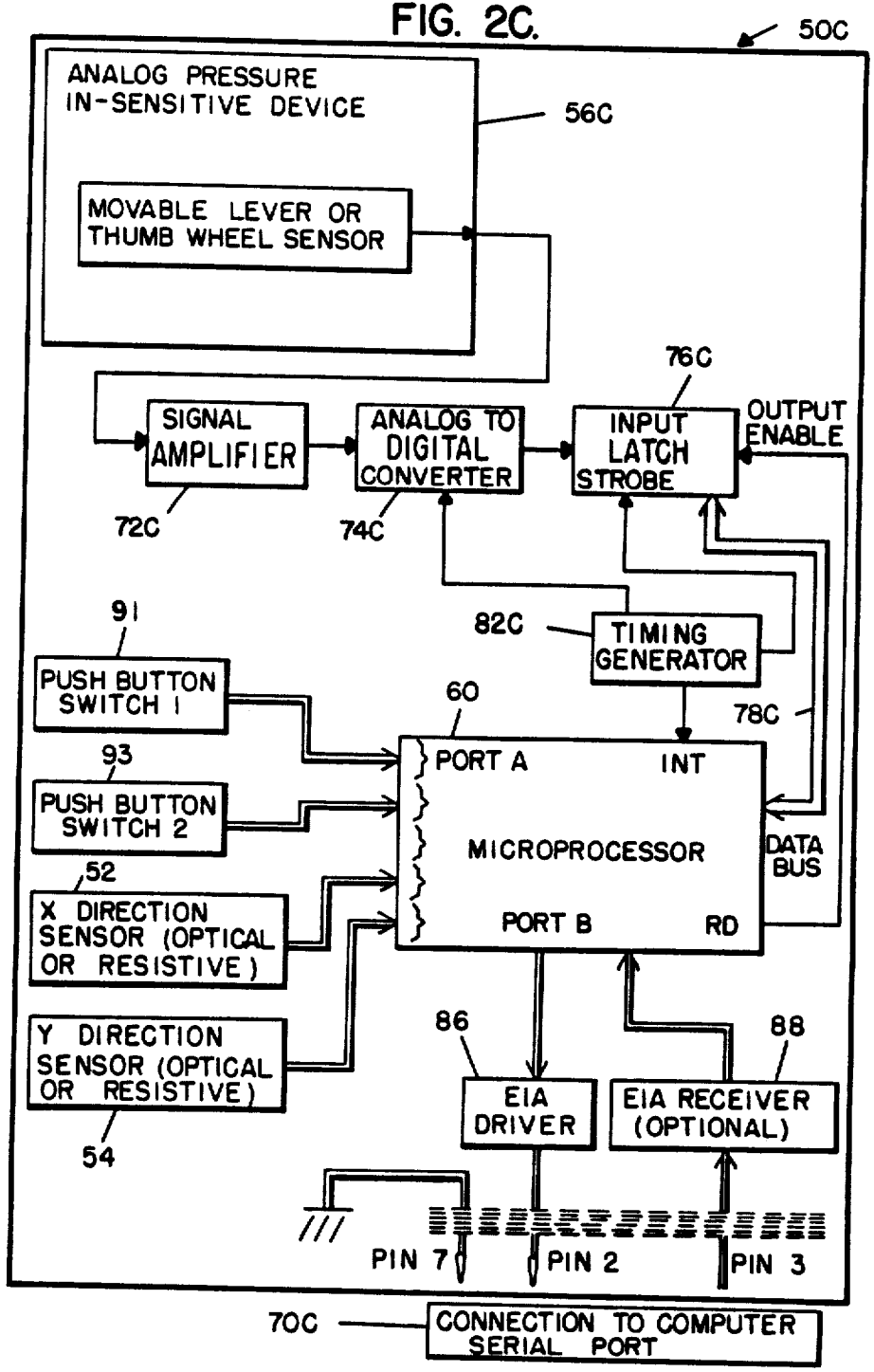
FIG. 2C is a block diagram of a three dimension input apparatus of the invention where the analog third dimension is determined through the use of a pressure insensitive device.

According to another set of embodiments, the means for providing a third analog input to a host processor is a pressure insensitive device. As indicated by FIG. 2C, examples of such devices might include a lever, a thumbwheel, or a slide control which could effect in an analog manner electrical or wave changes. For example, it will be appreciated that a thumbwheel could be connected to a potentiometer, a plate, or an iron rod, such that the resistance, capacitance, or inductance of a circuit respectively could be changed by the movement of the wheel. Or, if desired, the thumbwheel instead could be connected to an optical sensing mechanism by connecting the thumbwheel to a shutter which is situated between an optical source and its sensor. The shutter would have a wheel which has a graduated opening or translucent area such that when the wheel is moved, the light passing through the shutter is either increased or decreased. This variation is in turn detected by the optical sensor which converts the variation into a current flow or voltage which represents the analog signal input by the user. The voltage level would then be passed to the signal amplifier 72c, A/D converter 74c, latch 76c, and microprocessor 60c as was described above with reference to FIG. 2A. Another similar pressure insensitive analog third dimension devices might include a sonic sensor which could detect the position of a thumbwheel, lever, or slide control.

The three dimension analog input system and apparatus of the invention may take many forms. For example, a computer mouse could be arranged with either a pressure sensitive or pressure insensitive means to provide a third dimension. Or a computer mouse having two dimensional output could be combined with a pressure sensitive pad or surface over which it operates to provide a third dimension when the user applies downward pressure to the mouse. Likewise, a light pen or a stylus and bit pad may be arranged with either pressure sensitive or insensitive means, and in the case of the stylus, the pressure sensitive means could be either the stylus or the bit pad. The means for receiving the analog outputs of e.g. the mouse also may take numerous forms. For example, a microprocessor might be wired to the mouse, or the mouse might be arranged with ultrasonic or infrared pulsors which are arranged to signal provided detectors. (See, e.g. de Bruyne, Pieter, "Compact Large-Area Graphic Digitizer for Personal Computers" IEEE CG&A, December 1986 pp. 49-53.)

The input device may be used for many purposes. Thus, the third dimension could be a z dimension for providing a three dimensional computer graphics capability. In this manner, objects may be removed from behind other objects or inserted into the depth of a three dimensional rendering by "moving into" the rendering using the third analog dimension under the control of the user. If desired, upon reaching the depth destination, the user could have the option of clicking a push button switch to maintain a constant third dimension location. Such an option would be especially useful where the third dimension was accomplished with a pressure sensitive device arrangement.

Other applications for the three dimensional input device would include analog user control over line thickness, colors, shading and dithering of colors or shade. Thus, if a pressure sensitive device were utilized, different pressure on a stylus could be used to change the thickness or shade (darkness) of a line while drawing or digitizing. Such an arrangement would be directly akin to placing more pressure on a pencil while drawing on paper and provides a natural manner for accomplishing such tasks on computer. As such, the three dimensions of analog input would replace the need for the user to repetitively hit a push button switch, move to a different part of a program to choose line thickness or shade, and then return to the drawing each time a shade of line width had to be changed. The analog capability of the third dimension could thus provide an ease to such presently difficult tasks.

Figure 3:
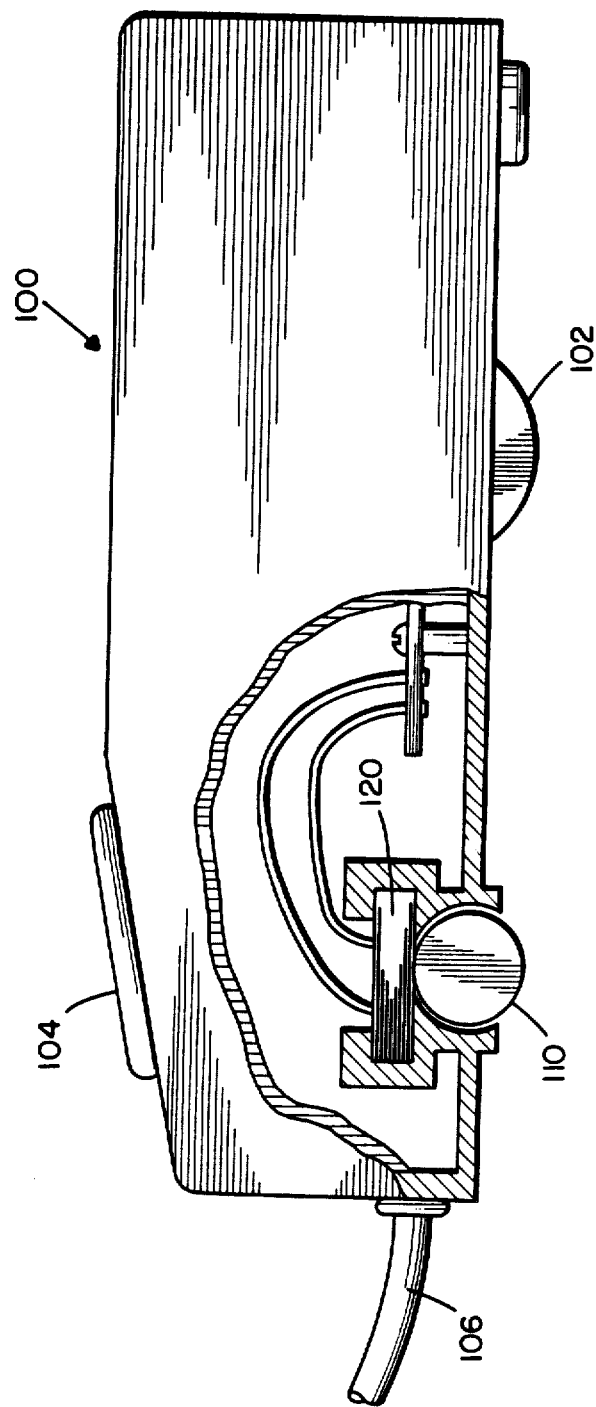
FIGS. 3 and 4 are partially cut away perspective views of a mouse and a stylus embodiment of the three dimension analog input invention respectively where a prior art mouse and a prior art stylus are adapted to receive under the hand control of the user a third dimension analog signal.

Turning to FIG. 3, an example of a computer mouse arranged in accordance with the teachings of the invention is seen. The mouse 100 generally includes a floating ball 102 for tracking x and y movement, a function button 104, a cable 106 for connection to a computer, and all of the circuitry of a standard mouse. Additionally, a pressure roller 110 is provided with a piezoelectric transducer 120 rigidly afixed adjacent thereto. As pressure is applied to the mouse, the pressure roller 110 is forced up into the piezoelectric transducer 120, causing a current to form therein. Since the current provided is a function of the change in pressure applied to the mouse, an integrator is used to provide a voltage output. Thus, if the pressure is not changing on the transducer 120, the transducer 120 does not provide a current. However, the integrator still provides a voltage based on the previous experience of the transducer. If the pressure on the mouse is increased or decreased, a resulting directional flow of current is provided by the transducer 120. Thus, the integrator will provide a larger or smaller voltage. When all pressure on the mouse is released, the resulting current will cause the integrator to provide a zero output voltage.

Figure 4:
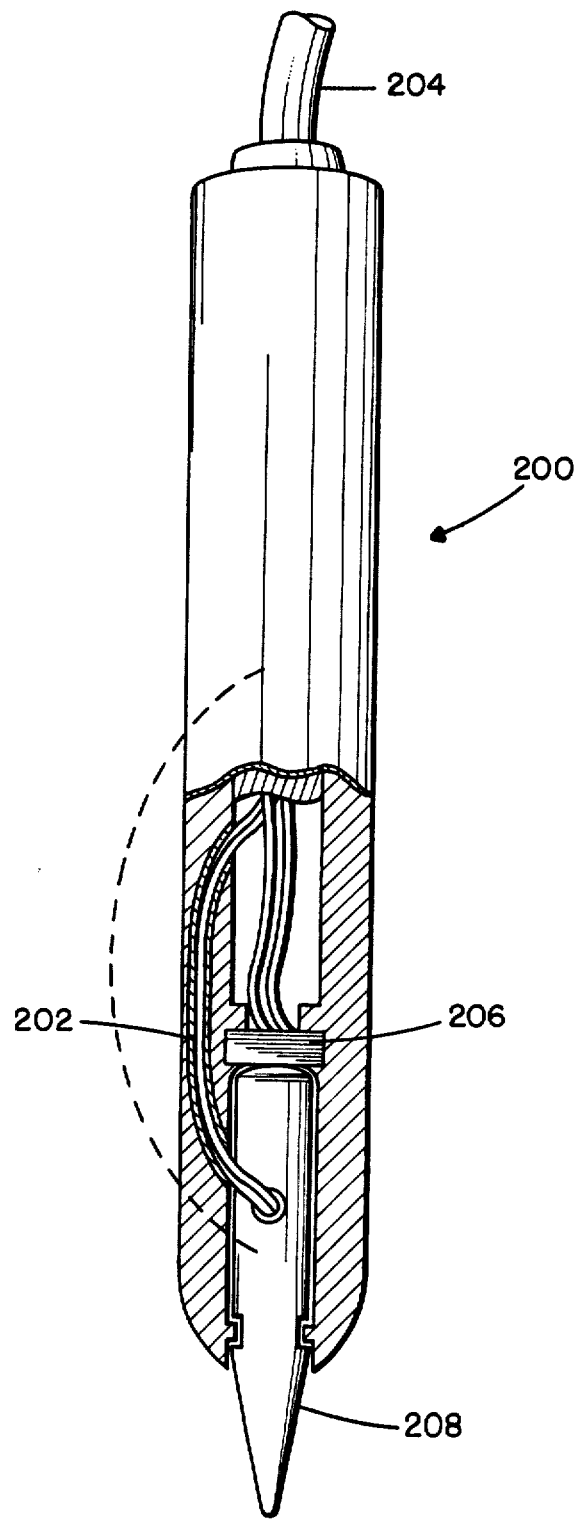

A similar arrangement to the piezoelectric mouse arrangement is seen in FIG. 4. Here a stylus 200 is provided with the usual stylus circuitry 202, a cable 204 for connection to a computer, and in addition, a strain gauge 206 and associated circuitry is provided. When the stylus is pressed with force against its pad, the tip portion 208 of the stylus 200 is pushed against the strain gauge 206, causing a change in the resistance of the strain gauge. As a result, the voltage over the strain gauge varies. Preferably, the output of the strain gauge is arranged to vary linearly with pressure so that a linear increase in pressure will result in a linear increase in voltage. Because the strain gauge gives a direct measure of pressure (rather than delta pressure), no integrator is needed.

There has been described and illustrated herein systems and apparatus for providing three dimensions of input to host processors. While particular embodiments of the invention have been described, it is not intended that the invention be limited thereby, as it is intended that the invention be broad in scope and that the specifications be read likewise. Thus, while particular pressure sensitive devices such as strain gauges, piezoelectric sensors, and springs were described for use with the invention, it will be appreciated that other pressure sensitive devices are known and could be easily utilized in the described or in a variety of other arrangements. Likewise, two particular circuits were described for taking the output of the pressure sensitive device and for processing it so that it could be input into a computer processor or the like, it will be appreciated that many different means for accomplishing the same are known and could be utilized. Further, while the invention was described in terms of being a "mouse", a "light pen" or a "stylus for a bit pad", those skilled in the art will recognize that the invention is useful for any handheld device where three dimensions of input into a computer or the like is desired. Finally, while the invention was mostly described in terms of having all three user input dimensions being sensed by a single apparatus, it will be appreciated that the apparatus may only comprise a means for permitting another apparatus to sense the three dimensions of input. Therefore, it will be apparent to those skilled in the art that other changes and modifications may be made to the invention as described in the specification without departing from the spirit and scope of the invention as claimed.

I claim:

1. A pressure sensitive computer mouse operable along a substantially planar surface for providing three dimensions of input to a host processor coupled to said mouse, wherein three dimensions of analog input to said mouse are under hand control of a user of said mouse, said mouse comprising:

(a) means for detecting and measuring movement of said mouse in two perpendicular dimensions along said substantially planar surface for providing at least a first output representative of said movement of said mouse in two perpendicular dimensions;

(b) pressure sensitive means for detecting and measuring an analog third dimensional input into said mouse under the hand control of the user while said mouse is located along said planar surface, and for providing a second output representative of said third dimensional input to said mouse, wherein said analog third dimensional input is a force applied by the user to said mouse which is perpendicular to said two perpendicular dimensions; and (c) electrical interface means at which said first and second outputs representative of said three dimensions of input to said mouse are provided, wherein said pressure sensitive means comprises a pressure roller in direct contact with said planar surface and a strain gauge rigidly mounted adjacently atop said pressure roller, and said pressure sensitive means is arranged such that upon an application of said force to said pressure roller, there is substantially no relative movement between said pressure roller and said strain gauge.

2. A mouse according to claim 1, further comprising:
(d) means coupled to said electrical interface means for receiving said first and second outputs and providing therefrom information suitable for input into said host processor, wherein said information is representative of said three dimensions of input.

3. A mouse according to claim 2, wherein:
said means coupled to said electrical interface means includes
a signal amplifier and analog to digitial converter for amplifying said second output into an optimal range for said analog to digital converter and for converting amplified analog signals into digital signals, to produce amplified digitized signals,
an input latch for storing said amplified digitized signals, and
a microprocessor for obtaining said amplified digitized signals from said input latch, for obtaining one of said first and second outputs, and for providing therefrom signals representative of said three dimensions of user input which are capable of being input into said host processor.

4. A mouse according to claim 3, further comprising:
(e) digital switch means for permitting said user to input digital information into said host processor.

5. A mouse according to claim 4, wherein:
said digital switch means provides a signal output which is sent to said microprocessor, and said signal output of said digital switch means comprises control information for at least control of said analog third dimensional user input.

6. A pressure sensitive computer mouse operable along a substantially planar surface for providing three dimensions of input to a host processor coupled to said mouse, wherein three dimensions of analog input to said mouse are under hand control of a user of said mouse, said mouse comprising:
(a) means for detecting and measuring movement of said mouse in two perpendicular dimensions along said substantially planar surface for providing at least a first output representative of said movement of said mouse in two perpendicular dimensions;
(b) pressure sensitive means for detecting and measuring an analog third dimensional input into said mouse under the hand control of the user while said mouse is located along said planar surface, and for providing a second output representative of said third dimensional input to said mouse, wherein said analog third dimensional input is a force applied by the user to said mouse which is perpendicular to said two perpendicular dimensions; and
(c) electrical interface means at which said first and second outputs representative of said three dimensions of input to said mouse are provided, wherein said pressure sensitive means comprises a pressure roller in direct contact with said planar surface and a piezoelectric transducer rigidly mounted adjacently atop said pressure roller, and said pressure sensitive means is arranged such that upon an application of said force to said pressure roller, there is substantially no relative movement between said pressure roller and said piezoelectric transducer.

7. A pressure sensitive computer mouse according to claim 6, wherein:
said pressure measurement means further comprises an integrator coupled to said piezoelectric transducer for integrating an electrical signal received from said piezoelectric transducer.

8. A mouse according to claim 7, further comprising:
(d) means coupled to said electrical interface means for receiving said first and second outputs and providing therefrom information suitable for input into said host processor, wherein said information is representative of said three dimensions of input.

9. A mouse according to claim 8, wherein:
said means coupled to said electrical interface means includes
a signal amplifier and analog to digital converter for amplifying said second output into an optimal range for said analog to digital converter and for converting amplified analog signals into digital signals, to produce amplified digitized signals,
an input latch for storing said amplified digitized signals, and
a microprocessor for obtaining said amplified digitized signals from said input latch, for obtaining one of said first and second outputs, and for providing therefrom signals representative of said three dimensions of user input which are capable of being input into said host processor.

10. A mouse according to claim 9, further comprising:
(e) digital switch means for permitting said user to input digital information into said host processor.

11. A mouse according to claim 10, wherein:
said digital switch means provides a signal output which is sent to said microprocessor, and said signal output of said digital switch means comprises control information for at least control of said analog third dimensional user input.

12. A pressure sensitive computer mouse operable along a substantially planar surface for providing three dimensions of input to a host processor coupled to said mouse, wherein three dimensions of analog input to said mouse are under hand control of a user of said mouse, said mouse comprising:
(a) means for detecting and measuring movement of said mouse in two perpendicular dimensions along said substantially planar surface for providing at least a first output representative of said movement of said mouse in two perpendicular dimensions;
(b) pressure sensitive means for detecting and measuring an analog third dimensional input into said mouse under the hand control of the user while said mouse is located along said planar surface, and for providing a second output representative of said third dimensional input to said mouse, wherein said analog third dimensional input is a force applied by the user to said mouse which is perpendicular to said two perpendicular dimensions; and
(c) electrical interface means at which said first and second outputs representative of said three dimensions of input to said mouse are provided, wherein said pressure sensitive means comprises a fluid-filled container in direct contact with said planar surface, said fluid-filled container having an outlet pipe, and a pressure transducer mounted adjacent an end of said outlet pipe, and said pressure sensitive means is arranged such that upon an application of said force to said fluid-filled container, there is substantially no relative movement between said fluid-filled container and said pressure transducer.

13. A mouse according to claim 12, further comprising:
   (d) means coupled to said electrical interface means for receiving said first and second outputs and providing therefrom information suitable for input into said host processor, wherein said information is representative of said three dimensions of input.

14. A mouse according to claim 13, wherein:
   said means coupled to said electrical interface means includes
   a signal amplifier and analog to digitial converter for amplifying said second output into an optimal range for said analog to digital converter and for converting amplified analog signals into digital signals, to produce amplified digitized signals,
   an input latch for storing said amplified digitized signals, and
   a microprocessor for obtaining said amplified digitized signals from said input latch, for obtaining one of said first and second outputs, and for providing therefrom signals representative of said three dimensions of user input which are capable of being input into said host processor.

15. A mouse according to claim 14, further comprising:
   (e) digital switch means for permitting said user to input digital information into said host processor.

16. A mouse according to claim 15, wherein:
   said digital switch means provides a signal output which is sent to said microprocessor, and said signal output of said digital switch means comprises control information for at least control of said analog third dimensional user input.

* * * * *